US008087031B2

(12) United States Patent
Violleau et al.

(10) Patent No.: US 8,087,031 B2
(45) Date of Patent: Dec. 27, 2011

(54) METHOD AND APPARATUS FOR DATA TRANSFER BETWEEN ISOLATED EXECUTION CONTEXTS

(75) Inventors: Thierry Violleau, Poissy (FR); Tanjore S. Ravishankar, San Jose, CA (US)

(73) Assignee: Oracle America, Inc., Redwood City, CA (US)

(*) Notice: Subject to any disclaimer, the term of this patent is extended or adjusted under 35 U.S.C. 154(b) by 1032 days.

(21) Appl. No.: 11/511,948

(22) Filed: Aug. 28, 2006

(65) Prior Publication Data

US 2010/0023951 A1 Jan. 28, 2010

Related U.S. Application Data

(60) Provisional application No. 60/757,735, filed on Jan. 9, 2006.

(51) Int. Cl.
| G06F 3/00 | (2006.01) |
| G06F 9/44 | (2006.01) |
| G06F 9/46 | (2006.01) |
| G06F 13/00 | (2006.01) |

(52) U.S. Cl. ...................................................... 719/315
(58) Field of Classification Search .................. 719/315
See application file for complete search history.

(56) References Cited

U.S. PATENT DOCUMENTS

| 6,119,229 | A * | 9/2000 | Martinez et al. ................ 726/28 |
| 2002/0032790 | A1* | 3/2002 | Linderman .................... 709/230 |
| 2002/0174224 | A1 | 11/2002 | Scheifler et al. |
| 2003/0204681 | A1* | 10/2003 | Arajs et al. .................... 711/147 |
| 2004/0216150 | A1 | 10/2004 | Scheifler et al. |
| 2006/0101422 | A1* | 5/2006 | Bourges-Waldegg et al. ............................. 717/136 |
| 2007/0061278 | A1* | 3/2007 | Schirmer et al. ................. 707/1 |

FOREIGN PATENT DOCUMENTS

| EP | 1 431 862 A2 | 6/2004 |
| WO | 0043878 A1 | 7/2000 |

OTHER PUBLICATIONS

Sun Microsystems, "How to Use Drag and Drop and Data Transfer", 2004, pp. 1-31.*
Sun Microsystems, "Tranfer Object", 2002, pp. 1-3.*
Gong, L. et al., "Implementing Protection Domains in the Java™ Development Kit 1.2", Proceedings of the Internet Society Symposium on Network and Distributed System Security, XP-002304112, Mar. 1988, 10 pages.
Gong, L. et al., "Going Beyond the Sandbox: An Overview of the New Security Architecture in the Java™ Development Kit 1.2", Proceedings of the Usenix Symposium on Internet Technologies and Systems, XP-002250254, Dec. 1997, 10 pages.

(Continued)

*Primary Examiner* — Andy Ho
*Assistant Examiner* — Timothy A Mudrick
(74) *Attorney, Agent, or Firm* — Osha • Liang LLP

(57) ABSTRACT

An approach for making an object owned by a first application that executes in a first isolated execution context accessible to a second application that executes in a second isolated execution context is described herein. According to this approach the object is associated with the first isolated execution context. A request is received to render the object accessible to the second application. Ownership of the object is transferred to the second application by changing the isolated execution context that is associated with the object to the second isolated execution context, thereby rendering the object accessible to the second application.

7 Claims, 3 Drawing Sheets

OTHER PUBLICATIONS

Nagaratnam, Nataraj et al., "Practical delegation for secure distributed object environments", Distributed Systems Engineering, Institute of Physics Publishing, Bristol, Great Britain, vol. 5, No. 4, XP-020073372, Dec. 1, 1998, 12 pages.

Wangham, Michelles et al., "Security Mechanisms for Mobile Agent Platforms Based on SPKI/SDSI Chains of Trust", Software Engineering for Multi-Agent Systems II Lecture Notes in Computer Science, Springer-Verlag, Berlin, vol. 2940, XP-019003515, 2004, 18 pages.

Claims, European application No. 06256576.7-2212, 5 pages.

European Patent Office, "European Search Report", European application No. 06256576.7-2212, received Jan. 3, 2008, 11 pages.

Molva, Refik et al., "A Distributed Access Control Model for Java", Computer Security, Esorics 2000 Lecture, Notes in Computer Science, Springer-Verlag, 2000, Heidelberg, Berlin, XP-019049349, vol. 1895, 18 pages.

Chen, Zhiqun, "Applet Firewall and Object Sharing," Chapter 9 of *Java Card Technology for Smart Cards: Architecture and Programmer's Guide*, published by Addison Wesley, Jun. 2000, pp. 105-127.

Knudsen, Jonathan, "What's New in MIDP 2.0," Sun Microsystems, retrieved from the internet at http://developers.sun.com/techtopics/mobility/midp/articles/midp20/, retrieved on Jan. 10, 2007, 8 pages.

Ortiz, Enrique C., "An Introduction to Java Card Technology—Part 1," Sun Microsystems, retrieved from the Internet at http://developers.sun.com/techtopics/mobility/javacard/articles/javacard1/, retrieved in Jan. 10, 2007, 16 pages.

European Patent Office, "Communication pursuant to Article 94(3) EPC", Application No. 06256576.7-2212, dated Jul. 17, 2008, 4 pages.

Claims, Application No. 06256576.7-2212, 3 pages.

European Patent Office, "Communication pursuant to Article 94(3) EPC", Application No. 07250044-2212, dated Jul. 3, 2008, 1 page.

Claims, Application No. 07250044-2212, 3 pages.

State Intellectual Property Office of P.R.C.; Notification of the First Office Action; Application No. 200710000611.6; May 20, 2010; (8 pages).

Office Action in the State Intellectual Property Office of P.R.C.; Application No. 200710000611.6; Mailed Dec. 2, 2010 (3 Pages).

\* cited by examiner

METHOD AND APPARATUS FOR DATA TRANSFER BETWEEN ISOLATED EXECUTION CONTEXTS

CLAIM OF PRIORITY

This application claims benefit of Provisional Application Ser. No. 60/757,735, filed Jan. 9, 2006, entitled "Method and Apparatus for Protection Domain Based Security," by Violleau et al., the entire contents of which are incorporated by reference as if fully set forth herein.

BACKGROUND

There are many computing environments having multiple software applications that need to interact with each other and with other software such as libraries and runtime environments. There needs to be a mechanism to protect the applications and objects owned by the applications, while still allowing interaction. One protection mechanism is to execute each application (or bundle of applications) in its own execution context. Herein, this is referred to as "isolated execution contexts."

Isolated execution contexts means that a first application cannot access objects of a second application (or the objects belonging to the system runtime environment) in another isolated execution context unless the second application (or system runtime environment) explicitly provides an interface for access to the data. However, access to the object is allowed to applications executing in the same isolated execution context the object was created in (the owning context). Isolated execution contexts may be enforced by a firewall. For example, the firewall enforces a set of rules to protect the object from unauthorized access.

To share data with applications in other isolated execution contexts, an application can provide a shareable interface object (SIO). Firewall rules allow a shareable interface object (SIO) to be accessed from another isolated execution context. In addition, any object can be passed as a parameter from an application in one isolated execution context to an application in another isolated execution context via an SIO without the firewall determining whether all rules to prevent unauthorized access to the parameter object in the second applications execution context are complied with. In other words, the firewall allows the parameter object to be passed based on the fact that the SIO is being used to pass the object. In addition to object ownership control, when an object is accessed, other language access controls may be enforced. For example, the Java language allows the programmer to designate an object to be restricted to access from within its own Java language package by declaring the class without the attribute tag "public".

However, passing objects (including arrays) as parameters or return values in an SIO is often of limited value. Usable parameters or return values of SIOs may be limited to primitive values, global arrays, runtime environment entry point objects, and SIOs. The limitation is part of the intrinsic definition of an isolation execution context—the parameter objects themselves belong to the first application's isolation execution context and are therefore not accessible from the second application's isolation execution context. Typically, arrays (other than global arrays) cannot be passed from one isolated execution context to another. To share the elements of an array, a developer may be able to create a wrapper SIO with a "get" method to individually access each element. However, using such a wrapper has a severe performance impact because accessing all the elements of the array requires repeatedly invoking the "get" method and enduring the cost of going through the firewall each time.

Smart cards are an example platform in which an application programmer may wish to pass an object to another application in a different isolated execution context. A smart card is a card that may resemble a credit card and contains an embedded integrated circuit (IC). Some smart cards are used as a subscriber identity module (SIM) card inside of a cellular telephone. Smart cards are highly secure by design, and tampering with one results in the destruction of the information it contains. Smart cards typically have microprocessors and memory for secure processing and storage. There also exists technology similar to smart cards, but in form factors other than smart cards. Examples of such related technology are smart buttons and USB tokens. These other technologies may be used for similar functions as smart cards. USB tokens can be plugged directly into the USB port of a PC. Both smart buttons and USB tokens provide programming capabilities similar to smart cards and have tamper-resistance properties.

Therefore, it would be desirable to allow for secure yet high-performance sharing in a computing environment that uses isolated execution contexts or the like.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

An approach for making an object owned by a first application that executes in a first isolated execution context accessible to a second application that executes in a second isolated execution context is described herein. According to an embodiment, the object is associated with the first isolated execution context. A request is received to render the object accessible to the second application. Ownership of the object is transferred to the second application by changing the isolated execution context that is associated with the object to the second isolated execution context, thereby rendering the object accessible to the second application.

According to other aspects, the approaches described herein encompass a machine-readable medium configured to carry out the foregoing functions.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION OF EMBODIMENT(S)

The systems and methods described herein relate to transferring ownership of an object between isolated execution contexts. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Interface for Transferring Ownership of Objects Between Applications Executing in Different Isolated Execution Contexts

Overview

Figure 1:
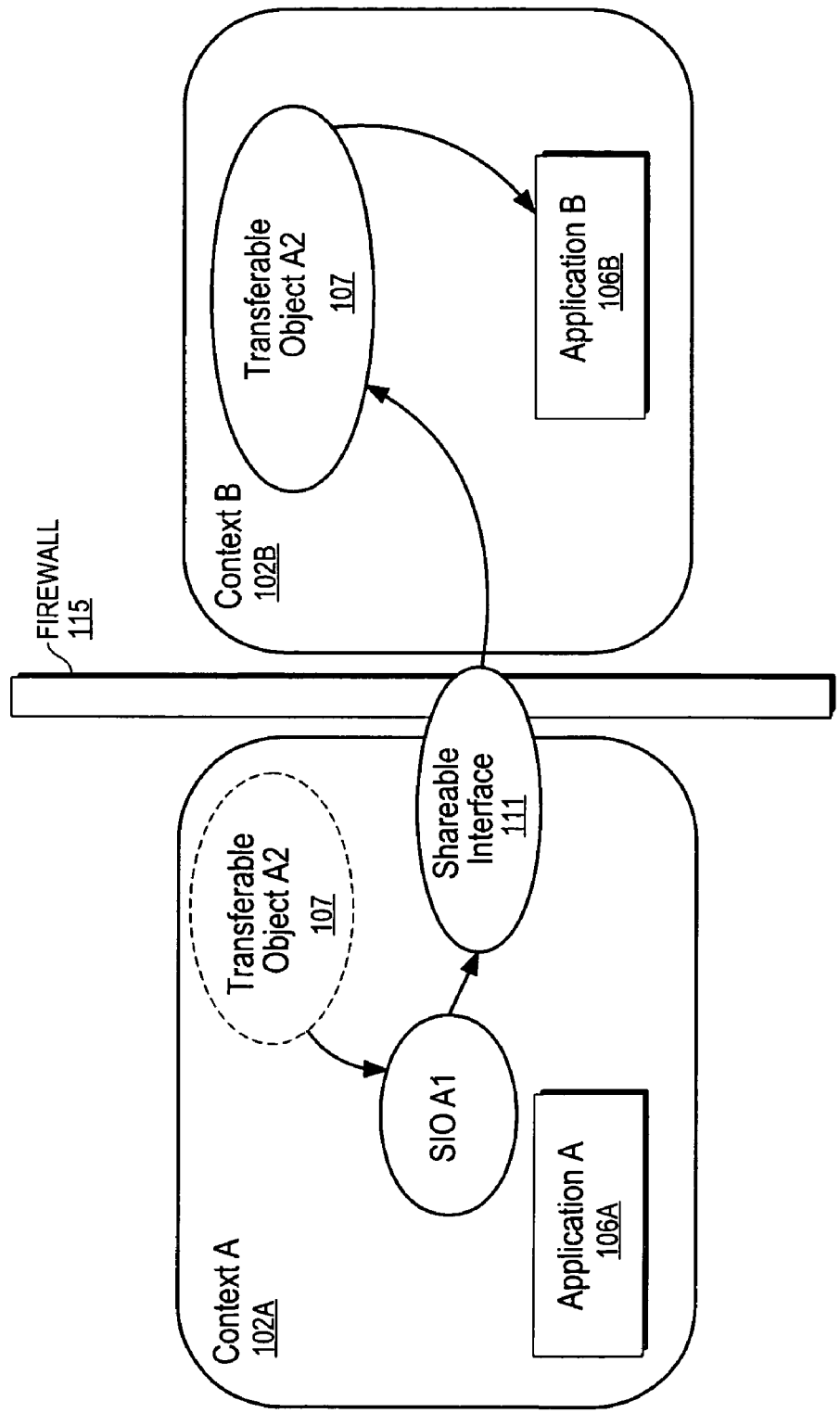
FIG. 1 is a diagram illustrating transferring ownership of an object between isolated execution contexts, in accordance with an embodiment of the present invention.

FIG. 1 is a diagram illustrating an environment having an interface for transferring ownership of an object between applications in different isolated execution contexts, in accordance with an embodiment of the present invention. Transferring ownership of an object allows the object to be passed between two applications. That is, without transferring ownership of the object, any attempt by a first application to pass the object to a second application in a different isolated execution context would not allow the second application to have access to the object. For example, the second application would be aware that the object exists, but it could not read or modify the object. FIG. 1 illustrates that ownership of object A2 107 is transferred from application A 106A to application B 106B, which execute in isolated execution contexts 102A and 102B, respectively. If desired, Application B 106B can transfer ownership of the object A2 107 back to Application A 106A.

The following example is used to illustrate transferring ownership between applications that execute in different isolated execution contexts. Application B may be a phone book application that is managing a mapping between a name and a phone number. Application B exposes an interface with a method ("the lookup method") that is for performing lookup of telephone numbers. The lookup method has a string for passing the name, and a string for returning the telephone number. Application A may be an application in a different isolated execution context that desires to perform a mapping between a name and a telephone number. As an example, Application A may be a program that displays the telephone number in response to user input of a name and request for the telephone number. Application A calls the lookup method passing in a string for a person's name. Because the string was instantiated in isolated execution context A, Application A needs to transfer ownership of the string to Application B in order for Application B to be able to read the string. That is, the firewall 115 will prevent Application B from accessing the string unless ownership of the string is transferred to Application B.

Thus, Application A first transfers ownership of the string to Application B and then invokes the lookup method, passing the string as a parameter in the method. When Application B receives the call, it is able to access the string and lookup up the phone number. The phone number is instantiated in isolated execution context B. Therefore, to pass the phone number string to Application A, Application B first transfers ownership of the telephone number string to Application A and then returns the telephone number string as a return parameter from the lookup method call. Application A is able to read the telephone number string upon return from the lookup method.

Methods and systems provided herein for transferring ownership of objects are compatible with existing technologies. For example, object transfer in accordance with an embodiment of the present invention is compatible with the Java language, as well as other languages.

Isolated Execution Contexts

Application A 106A and Application B 106B each execute in their own isolated execution context 102A and 102B, respectively. One technique for creating an isolated execution context is to assign the same context identifier to each object that is instantiated in the isolated execution context, wherein the context identifier is unique from all other isolated execution contexts. Thus, application A 106A and transferable object A2 107 are assigned a context identifier of context A 102A when these objects are instantiated. In a similar manner, application B 106B is assigned a context identifier of isolated execution context B 102B when application B 106B is instantiated.

An object in an isolated execution context may be secured by verifying that the context identifier of an application seeking access to the object matches the context identifier of the object. A firewall 115 is used to implement this verification, in one embodiment. For example, the firewall 115 will prevent Application B 106B from accessing Object A2 107, when Object A2 is owned by Application A 106A, because Application B 106B is in a different isolated execution context than Object A2 107. This can be enforced by the firewall 115 determining that Application B 106B has a different context identifier than Object A2 107.

Shareable Interfaces

Application A 106A makes Shareable Interface 111 available to applications outside of isolated execution context A 102A. The Shareable Interface 111 allows access to objects in context A. For example, the Shareable Interface 111 allows Application B 206 to access Shareable Interface Object (SIO) A1 in isolated execution context A 102A. An SIO allows controlled sharing of data between two applications in different isolated execution contexts without firewall 115 restrictions. Thus, Application B 106B is free to access SIO A1 via Shareable Interface 111 without the firewall restrictions. For example, even though the context identifier of SIO A1 is different from the context identifier of Application B 106B, Application B 106B is able to obtain access to SIO A1 via Shareable Interface 111.

However, Application B 106B may not access Object A2 107 without firewall 115 restrictions because the context identifier of Object A2 107 is different from the context identifier of Application B 106B and Object A2 107 is not an SIO. In order for Application B 106B to have access to Object A2 107, ownership of Object A2 107 is transferred to Application B 106B, in accordance with an embodiment of the present invention.

The transfer of ownership is limited to objects passed through calls to or returns from a Shareable Interface, in one embodiment. As an example, for Application B 106B to obtain ownership of transferable object A2 107, Application B makes a call to Shareable Interface 111, in one embodiment. Additionally, transfer of ownership from the first isolated execution context to the second isolated execution context is only required on object parameters which are not accessible from the second isolated execution context. Examples of objects for which transfer of ownership might not be required include SIOs, global arrays, and primitive data. A global array is an array object that has been designated as being accessible by all isolated execution contexts. Safeguards may be added to limit the transfer of ownership of the transferable object A2 107 such that its transfer only occurs during calls to or returns from a shareable interface, such as Shareable Interface 111.

In one embodiment, the SIO A1 implements the shareable interface 111 and the SIO A1 provides methods for passing transferable objects such as A2 107. An SIO is an object which provides a controlled access view ("implements" in Java language terminology) for external access. This controlled view is a set of access methods defined as the Shareable Interface 111, in one embodiment.

In one embodiment, the ownership transfer is transparent to the application. For example, the shareable interface 111 may comprise what is herein referred to as "proxy" code to cause the ownership transfer without either Application A 106A or Application B 106B invoking a method or function to transfer object ownership. In one embodiment, transfer of ownership is performed by the firewall (e.g., firewall 115) that provides isolation for a particular isolated execution context. The transfer ownership by the firewall is transparent to the application that owns the object.

Transferable Classes

A defined set of classes are transferable between applications executing in different isolated execution contexts, in accordance with an embodiment of the present invention. Thus, application A 106A should not transfer ownership of objects that are not in the set of transferable classes. Examples of the defined set of transferable classes, include but are not limited to, arrays of SIOs, arrays of primitives, String, primitive wrappers (e.g., Integers, etc.), etc. Objects in classes not defined as transferable may be prohibited from being passed by transferring ownership, in accordance with an embodiment of the present invention. Objects in the set of transferable classes do not need to be explicitly tagged as transferable by an application to allow transfer. Rather, the computing environment on which the application executes defines the transferable objects, in one embodiment. Transferable object classes may be designated as such in a runtime environment.

Transferring Ownership of Objects

A) Programmatic Transfer of Ownership

An application can explicitly transfer the ownership of an object it owns and then pass the object (that is bound to its isolated execution context) to another application in another isolated execution context. An application can transfer ownership of an object by invoking a method or function, in one aspect. The following are two examples of methods for transferring object ownership.

transferOwnership(Object object, URI|AID recipient)
transferOwnership(Object object, Shareable SIO)

The first argument to each of these methods is the object whose ownership is to be transferred. The second argument represents a URI (Uniform Resource Identifier) or AID (Application Identifier) of the recipient application in the first example method. The second argument represents an SIO of the recipient in the second example method.

Object ownership can be transferred back and forth between interacting applications such as a server application and its client. The same array can be used to transfer data between, for example, a server application and its client application over several interactions. The client application may provide the array into which the server application is to copy data.

B) Transparent Transfer of Ownership

Transparent transferring of ownership can be implemented by tool-generated code (e.g., either proxy classes or code inserted into SIO). Proxy classes are proxies for an actual SIO class. A proxy class generates a class that has the same method as all the SIOs. A proxy class exposes the same interface as the original SIO class. For example, a proxy class exposes the same set of methods or a superset. Calls to the methods of a proxy object are delegated to the same methods of the original SIO object. The proxies are in charge of transparently creating defensive copies of objects (e.g., parameter in SIO call mutable object and return values) and transferring ownership of these copies to the server and upon return, respectively to the client. The proxies may be generated and installed along with the application.

For example, referring to the example of the application with phone book lookup, a proxy can be generated for the phone book method of Application B. The proxy is generated when Application B is installed. The proxy is able to perform any copying of objects and ownership transfer of objects that is needed. When Application A calls the phone book method, the proxy method is invoked.

In one embodiment, code is inserted into an SIO A1 class automatically, when application A is being developed by the programmer.

Transparent transfer of ownership is performed by a firewall, in accordance with one embodiment. For example, the firewall transfers ownership of objects passed as arguments or return values in SIO method calls. The firewall performs the ownership transfer by invoking the ownership transfer API described earlier automatically on behalf of the application during program execution.

Transfer of Ownership of Mutable and Immutable Objects

Transfer of ownership of mutable objects may be handled differently from immutable objects, as discussed in the following sections.

Mutable Objects

Mutable objects are objects that may change after they are instantiated. Examples of mutable objects are arrays (of primitives, SIOs, above-mentioned immutable objects, and here-mentioned mutable objects), StringBuffer, and Vector. There are many other types of mutable objects. Mutable objects should not be directly passed between applications in different isolated execution contexts. The reason is that the firewall will prevent the object from being accessed without ownership transfer. Thus, the ownership of such mutable objects is transferred to allow the former owner to pass the mutable objects to the new owner. Once the ownership has been transferred, the initial owner will no longer have access to the object. Therefore, the firewall will block the initial owner's attempt to access to the object.

Immutable Objects

An immutable object is one in which the object is not permitted to change after it is instantiated. Examples of immutable objects are String and primitive wrappers. Some immutable objects are not bound to an isolated execution context. For example, primitive values might not be assigned to an isolated execution context. Therefore, there is no need to transfer ownership of immutable objects not bound to an isolated execution context.

However, some immutable objects are bound to an isolated execution context, in accordance with an embodiment of the present invention. For such immutable objects to be accessed by an application in a different isolated execution context, ownership of the immutable object is transferred to that applications isolated execution context. Another aspect uses tool-generated proxies to transfer ownership of the objects and to create the defensive copies, if necessary. Tool generated proxies are discussed below. Thus, the technique is very developer friendly in that the proxies can be used instead of the application calling a method to transfer ownership of the object.

Defensive Copy Object Creation and Transfer of Object Ownership

A) Defensive Copying

A defensive copy of the object may be created and the ownership of this defensive copy transferred to an application executing in another isolated execution context to share the state of the object. A software method may be used to duplicate the objects. The method may take as an argument the name of the object to be duplicated. This method creates defensive copies of mutable objects. Transfer of ownership can be performed on the defensive copy, thereby allowing the sharing application to proceed processing with the original object. A reason for transferring ownership of the defensive copy is that the defensive copy is initially created in the same isolated execution context as the original object. Therefore, the defensive copy is created with the context identifier associated with the isolated execution context in which it is created, in this embodiment. Thus, the context identifier should be changed to the context identifier of the other isolated execution context to transfer the defensive copy.

If the object to be shared references a second object, a defensive copy of the second object is also made, in this embodiment. If the second object references a third object, then a defensive copy of the third object may be made. The process of copying the object is referring to herein as a recursive copying process. However, the depth of the copying process may be restricted for reasons, including but not limited to, the following reasons. The depth of copying may be restricted to the classes of objects that are defined as transferable. The depth of copying may be restricted by stopping when reaching SIOs, as there may be other means of protecting the sharing of these objects. The depth of copying may be restricted by stopping when reaching primitives or above-mentioned immutable objects. Such an immutable object does not need to be copied, as the original may be shared.

Copying may be further controlled with annotations that will tag fields that should not be copied. For example, a programmer may add annotations to the code to indicate which fields should not be copied. As a particular example, the Java programming language allows for such annotations to code.

B) Transfer of Ownership of Copies

A recursive process applies to transfer of ownership of objects To transfer ownership of an object that references another object, ownership of the referenced object may also be transferred. However, the depth of transferring ownership may be restricted for reasons, including but not limited to, the following reasons. The depth of transferring ownership may be restricted to the classes of objects that are defined as transferable. The depth of transferring ownership may be restricted by stopping when reaching SIOs, as there may be other means of protecting the sharing of these objects. Since there may be other means of protecting the sharing of SIOs, ownership does not need to be transferred. The depth of transferring ownership may be restricted by stopping when reaching primitives or above-mentioned immutable objects.

Flow for Transferring Object Ownership Between Isolated Execution Contexts

Figure 2:
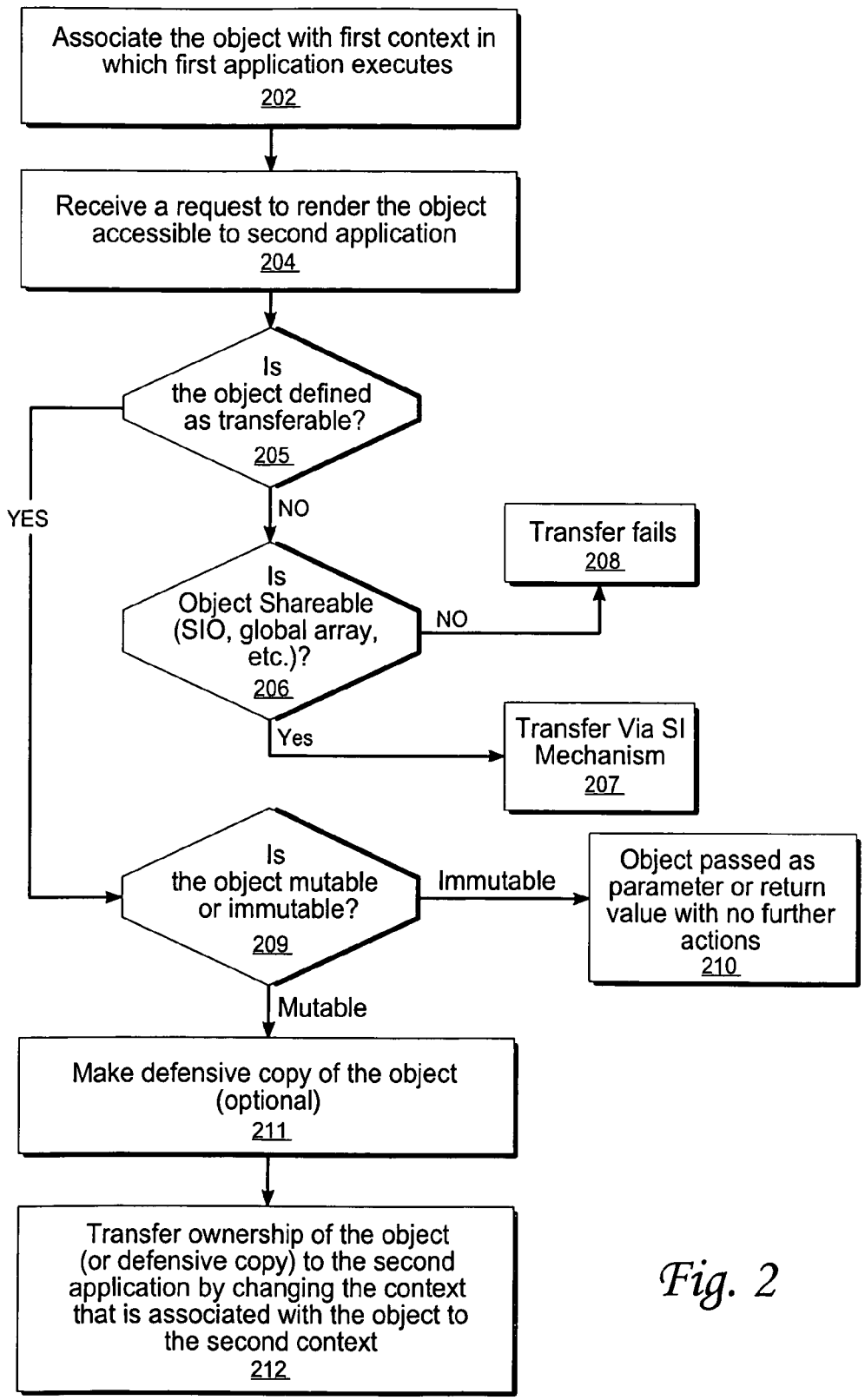
FIG. 2 illustrates a process for transferring ownership of an object between isolated execution contexts, in accordance with an embodiment of the present invention.

FIG. 2 illustrates a process 200 for transferring ownership of an object between isolated execution contexts, in accordance with an embodiment of the present invention. Process 200 will be described using an example based on FIG. 1, in which application A transfers ownership of an object to application B. In step 202, the object is associated with a first isolated execution context in which a first application executes. For example, when application A creates the object, the object is assigned (e.g., stamped with) a context identifier associated with isolated execution context A.

In step 204, a request is received to render the object accessible to a second application that executes in another isolated execution context. Transferring ownership of objects may be handled transparently or programmatically. For example, programmatic transferring can be implemented by invoking a method or function. As a particular example, application A invokes a method to transfer ownership of the object to application B. Transparent transferring of ownership can be implemented by tool-generated code and is discussed below. Herein, the tool-generated code is referred to as a "proxy." A firewall transfers ownership of the object, in one embodiment.

In step 205, a determination is made as to whether the object is transferable. For example, the computing environment on which application A executes may have a defined set of transferable classes. If the object is not an instance of a transferable class, then control passes to step 206, wherein a determination is made as to whether the object is of a type of shareable objects already handled by a Shareable Interface mechanism (such as SIO, global array, etc.), in which case the object is passed as a parameter or a return value without further actions, in step 207. Otherwise the transfer of ownership fails, in step 208.

However, if the object is an instance of a transferable class, as determined in step 205, then control passes to optional step 209, which is a determination of whether the object is immutable or mutable. If the object is immutable, the object is accessible with no further tests, in step 210. If the object is mutable, then control passes to step 211, which is the optional creation of a defensive copy of the object. Defensive copies have been discussed herein previously. It is not required that a defensive copy be made.

In step 212, transferring ownership of the object (or the defensive copy) to the second application is achieved by changing the context identifier that is associated with the object. For example, the context identifier of the object is changed from the identifier of isolated execution context A to the context identifier of isolated execution context B. It may therefore be possible for applications executing in isolated execution context B other than application B to access the object.

This process 200 may be applied to every object passed as an argument or return value of a call to a method of an SIO. Further, transfer of object ownership allows for reuse of the same object over multiple SIO method calls. Thus, transferring objects in accordance with an embodiment of the present invention is well-suited for arrays of primitives or arrays of SIOs. However, transferring ownership of objects for data sharing has performance benefits for other types of objects also.

Hardware Overview

Figure 3:
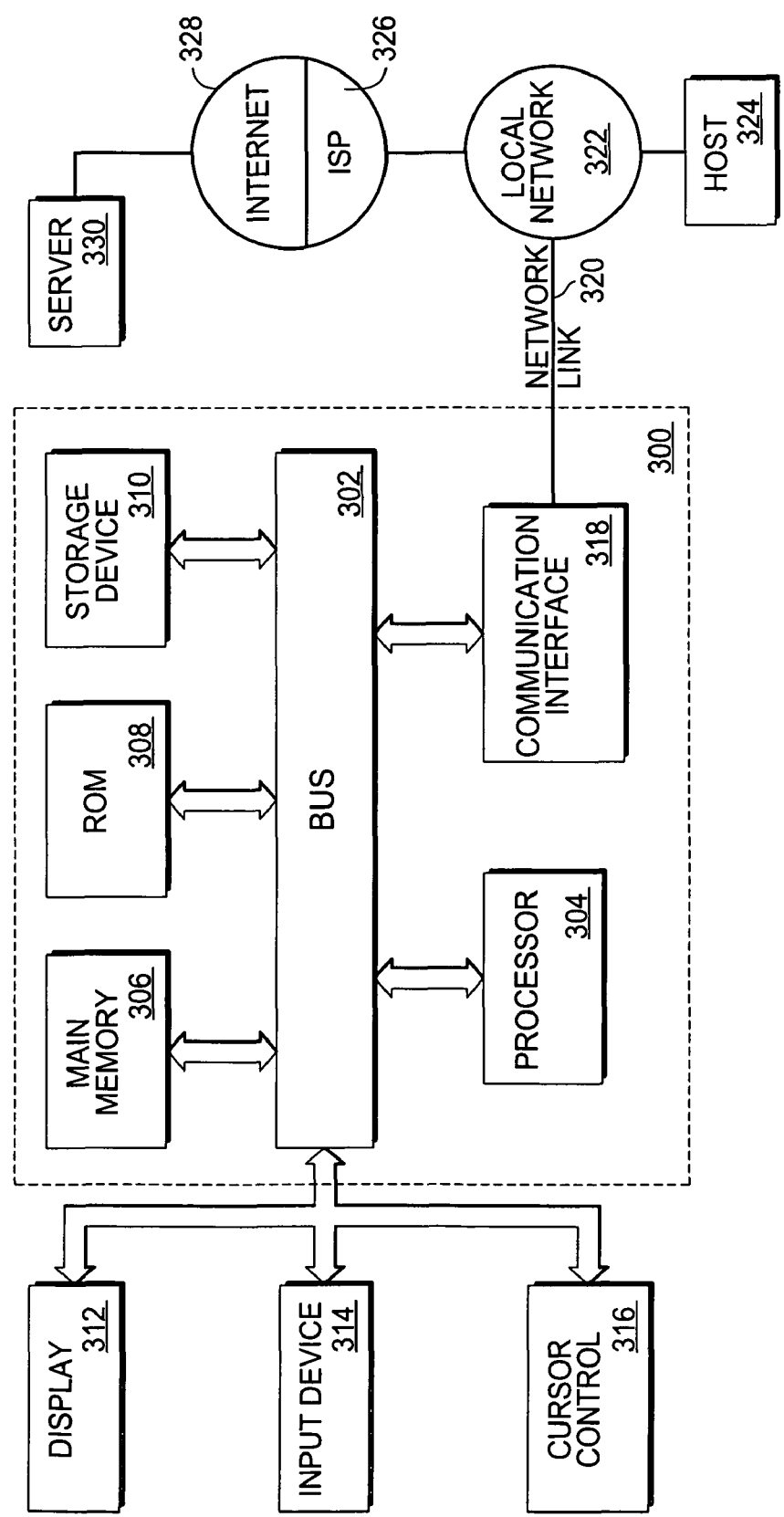
FIG. 3 is a block diagram that illustrates a computer system upon which an embodiment in accordance with the present invention may be implemented.

In one embodiment, process 200 of FIG. 2 comprises a set of instructions that are executed by one or more processors. In one embodiment, the applications and the shareable interface 111 in FIG. 1 comprise a set of instructions that are executed by one or more processors. FIG. 3 shows one possible embodiment in which to execute the instructions. Computer system 300 includes a bus 302 for facilitating information exchange, and one or more processors 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions by processor 304. Computer system 300 may further include a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312 for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

In computer system 300, bus 302 may be any mechanism and/or medium that enables information, data, etc., to be exchanged between the various components. Bus 302 may be a network connection that connects one or more of the components. Any mechanism and/or medium that enables information, data, etc., to be exchanged between the various components may be used as bus 302.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 303 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and tangible media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other tangible medium from which a computer can read.

Various forms of machine-readable media may be involved in carrying one or more sequences of one or more instructions to processor 304 for execution. For example, the instructions may be carried on a magnetic disk of a remote computer. Bus 302 may carry the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented.

Network link 320 typically provides data communication through one or more networks to other devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:
1. A non-transitory machine readable medium comprising a set of instructions which, when executed by one or more processors, causes the one or more processors to perform the following operations:
   instantiate an object in a first isolated execution context to obtain a first instantiated object, wherein the first instan- tiated object is owned by a first application that executes in the first isolated execution context;

associate the first instantiated object with the first isolated execution context by assigning a first identifier for the first isolated execution context to the first instantiated object;

receive, from the first application, a request to transfer ownership of the first instantiated object from the first application to a second application that executes in a second isolated execution context;

make a first determination that the first instantiated object is defined as a member of a transferrable class;

based on the first determination:
    make a second determination that the first instantiated object is a mutable object that may be changed after instantiation;

based on the second determination and the request from the first application to transfer ownership:
    transfer ownership of the first instantiated object from the first application to the second application by assigning a second identifier for the second isolated execution context to the first instantiated object, thereby rendering the first instantiated object accessible to the second application, wherein the first instantiated object is a single instance, wherein the single instance is accessible to the first isolated execution context when the first instantiated object is owned by the first application, wherein the single instance is accessible to the second isolated execution context when the first instantiated object is owned by the second application, and wherein the second application is isolated from the first application by a firewall, wherein the firewall enforces a requirement that only an application having a same isolated execution context identifier as the first instantiated object is able to access the first instantiated object.

2. The non-transitory machine readable medium of claim 1, wherein the transferable class is defined as transferable by a platform on which the first application executes.

3. The non-transitory machine readable medium of claim 1, wherein the set of instructions further comprise instructions which, when executed by the one or more processors, causes the one or more processors to perform the following operation:
    invoke a function to initiate transferring ownership of the first instantiated object to the second application.

4. The non-transitory machine readable medium of claim 1, wherein the set of instructions further comprises instructions which, when executed by the one or more processors, causes the one or more processors to perform the following operations:
    repeatedly transfer ownership of the first instantiated object from the first application to the second application and back to the first application by repeatedly assigning the context identifier for the first instantiated object from the first identifier to the second identifier and back to the first identifier.

5. The non-transitory machine readable medium of claim 1, wherein the first instantiated object has at least one attribute that can change after instantiation and wherein transferring ownership of the first instantiated object allows the second application to make changes to the at least one attribute of the first instantiated object.

6. The non-transitory machine readable medium of claim 1, wherein the first instantiated object references a second instantiated object, wherein the second instantiated object is associated with the first isolated execution context, and wherein the set of instructions further comprises instructions which, when executed by the one or more processors, causes the one or more processors to perform the following operation:
    based on the second determination:
        transfer ownership of the second instantiated object to the second application by assigning the second identifier for the second isolated execution context to a second context identifier for the second instantiated object, thereby rendering the second instantiated object accessible to the second application.

7. The non-transitory machine readable medium of claim 1, wherein the set of instructions further comprise instructions which, when executed by the one or more processors, causes the one or more processors to perform the following operations:
    obtain a second instantiated object owned by the first application;
    receive a request to render the second instantiated object accessible to the second application;
    create, in response to the request to render the second instantiated object accessible to the second application, a defensive copy of the second instantiated object, wherein the defensive copy is owned by the first application; and
    transfer ownership of the defensive copy from the first application to the second application.

* * * * *